(12) United States Patent
Tiana et al.

(10) Patent No.: US 11,175,504 B2
(45) Date of Patent: Nov. 16, 2021

(54) MIXED REALITY HEAD WORN DISPLAY (71) Applicant: Rockwell Collins, Inc., Cedar Rapids, IA (US)

(72) Inventors: Carlo L. Tiana, Portland, OR (US); Eric P. Stratton, Portland, OR (US); Christopher A. Keith, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/059,742

(22) Filed: Aug. 9, 2018

(65) Prior Publication Data

US 2020/0049993 A1 Feb. 13, 2020

(51) Int. Cl.
*G02B 27/01* (2006.01)
*G06F 3/01* (2006.01)
*G06T 19/00* (2011.01)

(52) U.S. Cl.
CPC ......... *G02B 27/0172* (2013.01); *G06F 3/013* (2013.01); *G06T 19/006* (2013.01); *G02B 2027/0138* (2013.01); *G02B 2027/0196* (2013.01)

(58) Field of Classification Search
CPC ........ G02B 27/0172; G02B 2027/0196; G02B 2027/0138; G06T 19/006; G06F 3/013
See application file for complete search history.

(56) References Cited

U.S. PATENT DOCUMENTS

| | | | |
|---|---|---|---|
| 6,037,914 A | 3/2000 | Robinson | |
| 9,766,465 B1 | 9/2017 | Tiana et al. | |
| 2001/0033366 A1 | 10/2001 | Melville | |
| 2010/0238161 A1* | 9/2010 | Varga | G06T 17/05 345/419 |
| 2016/0152351 A1* | 6/2016 | Shanbhag | G02B 27/0093 |
| 2016/0286210 A1 | 9/2016 | Border et al. | |
| 2017/0154446 A1* | 6/2017 | N | G06T 1/0007 |
| 2017/0212398 A1* | 7/2017 | Cao | H01L 21/77 |
| 2017/0219827 A1 | 8/2017 | Pan et al. | |
| 2017/0256095 A1 | 9/2017 | Bani-Hashemi | |

FOREIGN PATENT DOCUMENTS

DE   10 2009 028 498 A1   2/2011

OTHER PUBLICATIONS

U.S. Appl. No. 15/945,708, filed Apr. 4, 2018, Tiana et al.
Partial European Search Report for European Patent Application No. 19000344.2 dated Feb. 21, 2020, 12 pages.

* cited by examiner

*Primary Examiner* — Dennis P Joseph
(74) *Attorney, Agent, or Firm* — Suiter Swantz pc llo (57) ABSTRACT

A head worn display (HWD) includes a head attachment region, an internal display and a controller. The internal display is viewable by a user and includes variable transparency areas. The internal display is arranged to display at least a portion of an external region external to the HWD. The controller is configured to control the variable transparency areas to block view of a region of the external region and to control the internal display to overlay information in a region of the internal display corresponding to the region of the external region which is blocked.

17 Claims, 7 Drawing Sheets

MIXED REALITY HEAD WORN DISPLAY

The inventive concepts disclosed herein generally relate to head worn displays.

BACKGROUND

Head worn displays (HWDs) may be worn by a user and provide a user with visual information. For virtual reality displays, all of the image on the display viewed by a user may be rendered. Augmented reality displays, on the other hand, combine light by optical means to present a user with virtual information superimposed on the real world. Augmented reality HWDs typically compromise between cost, field of view (FOV) and size. Most traditional HWD application for augmented reality include increasing the size of conventional optics to the point they are overly large and cumbersome to the user in order to achieve a wide FOV.

SUMMARY

In one aspect, embodiments of the inventive concepts disclosed herein are directed to a head worn display (HWD) including a head attachment region, an internal display and a controller. The internal display is viewable by a user and includes variable transparency areas. The internal display is arranged to display at least a portion of an external region external to the HWD. The controller is configured to control the variable transparency areas to block view of a region of the external region and to control the internal display to overlay information in a region of the internal display corresponding to the region of the external region which is blocked.

In a further aspect, embodiments of the inventive concepts disclosed herein are directed to a HWD including a head attachment region, an internal display viewable by a user of the HWD, one or more image detectors, and a controller. The one or more image detectors are arranged to detect an image of an external region external to the internal display. The controller is configured to control the internal display to display the detected image and to overlay information over the displayed detected image.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Embodiments of the inventive concepts disclosed herein regarding HWDs with variable transparency areas provide for functions such as enhancement, replacement, augmentation and occlusion in a display. The HWDs provide functionality for providing check lists at appropriate times, replacing the view of failed displays, providing visual information for emergency situations, and providing peripheral cue augmentation, for example.

HWDs may also be arranged in a mixed reality configuration where an internal display viewed by a user includes images of a region external to the internal display which is detected by image detectors. In the mixed reality configuration the internal display displays the detected image along with overlay information. Such an arrangement may obtain a wide FOV, such as nearly 120 degrees, for example. Further, real world imagery is relayed to the user via the image detectors.

Figure 1:
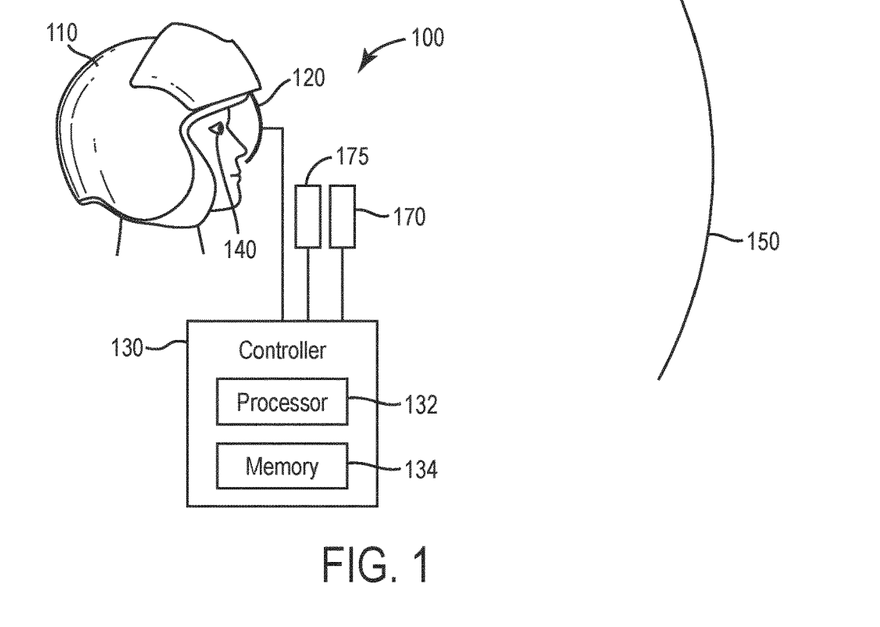
FIG. 1 is a schematic illustrating a head worn display according to inventive concepts disclosed herein.

FIG. 1 is a schematic illustrating a HWD 100 according to inventive concepts disclosed herein. The HWD 100 includes a head attachment region 110, an internal display 120, and a controller 130. The HWD 100 may further include an eye tracker 170 and head tracker 175.

The head attachment region 110 may be worn by a user, and may be a helmet, for example. Alternatively, the head attachment region 110 may include googles, for example. The internal display 120 is attached to the head attachment region 110.

The HWD 100, including the head attachment region 110, internal display 120, and controller 130, is shown in FIG. 1 relative to a user eye 140, and an external region 150. The user eye 140 and the external region 150 are not part of the HWD 100. The eye tracker 170 tracks the position and orientation of the user eye 140. The head tracker 175 tracks the position and orientation of the user head.

Figure 2A:
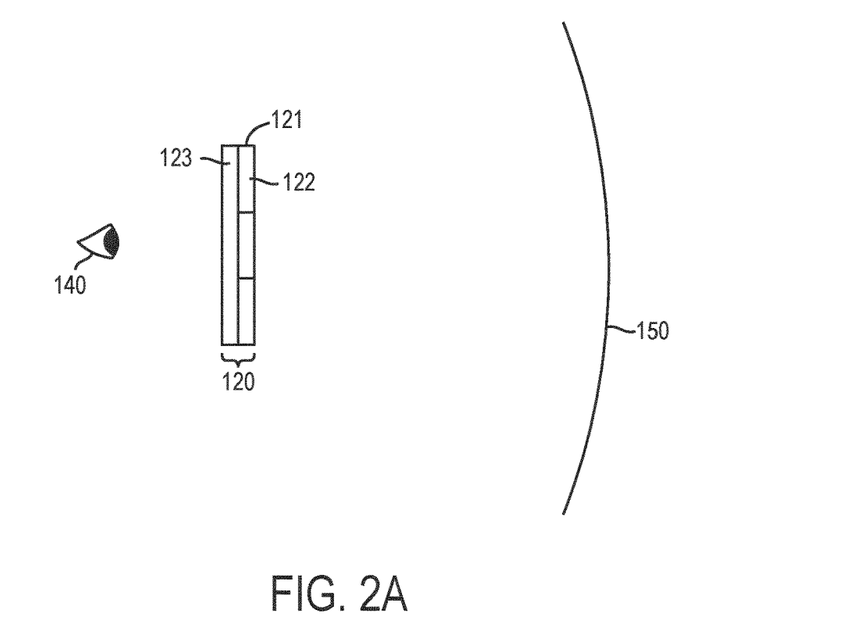
FIG. 2A illustrates a side view of an arrangement of an internal display according to inventive concepts disclosed herein.
Figure 2B:
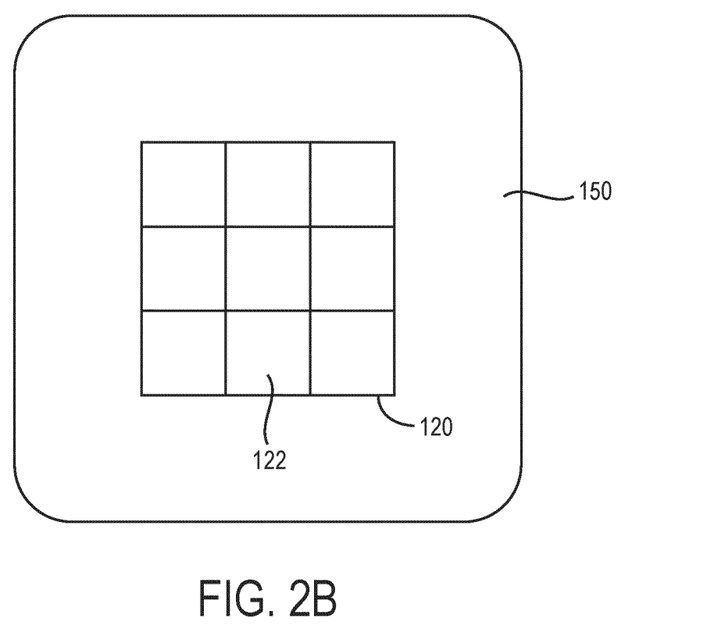
FIG. 2B illustrates a front view of an arrangement of an internal display according to inventive concepts disclosed herein.

FIG. 2A illustrates an arrangement of the internal display 120 from a side view relative to the user eye 140 and the external region 150, while FIG. 2B illustrates an arrangement of the internal display 120 from a front view relative to the external region 150.

The internal display 120 has a plurality of variable transparency areas 122. For ease of illustration, FIG. 2B illustrates only nine variable transparency areas 122. In general, the number of variable transparency areas 122 may be many more than nine. When the variable transparency areas 122 are transparent, at least a portion of the external region 150 may be seen on the internal display 120 by the user eye 140. That is, the internal display 120 is arranged to display at least a portion of the external region 150 external to the HWD 100.

As seen in FIG. 2A, the internal display 120 may include a variable transparency layer 121, which includes the variable transparency areas 122, and a combiner 123. The combiner 123 combines an image of the external region 150 which is not blocked by the variable transparency layer 121 with an image provided via the controller 130. The transparency layer 121 may be a electrochromic layer, for example, where the transparency of the variable transparency areas 122 are controlled by voltages applied via the controller 130. An example of a variable transparency layer and combiner may be found, for example, in U.S. application Ser. No. 15/945,708 entitled "SPATIALLY ADDRESSABLE ELECTROCHROMIC LIGHT MODULATOR" filed Apr. 4, 2018, which is incorporated by reference in its entirety.

Referring to FIG. 1, the controller 130 may include a processor 132 and a memory 134. The controller 130 controls the eye tracker 170 to determine the orientation and position of the user eye 140, and possibly the head tracker 175 to determine the orientation and position of the user head. The controller 130 further controls the internal display 120 to vary the transparency of the variable transparency areas 122. Still further the controller 130 controls the internal display 120 to display overlay information on the internal display 120.

For example, the controller 130 may control the variable transparency areas 122 to block a view to the user eye of a region of the external region 150, and to control the internal display 120 to overlay information in a region of the internal display 120 corresponding to the region of the external region 150 which is blocked. The overlay information may include text and/or symbols, for example.

Figure 3:
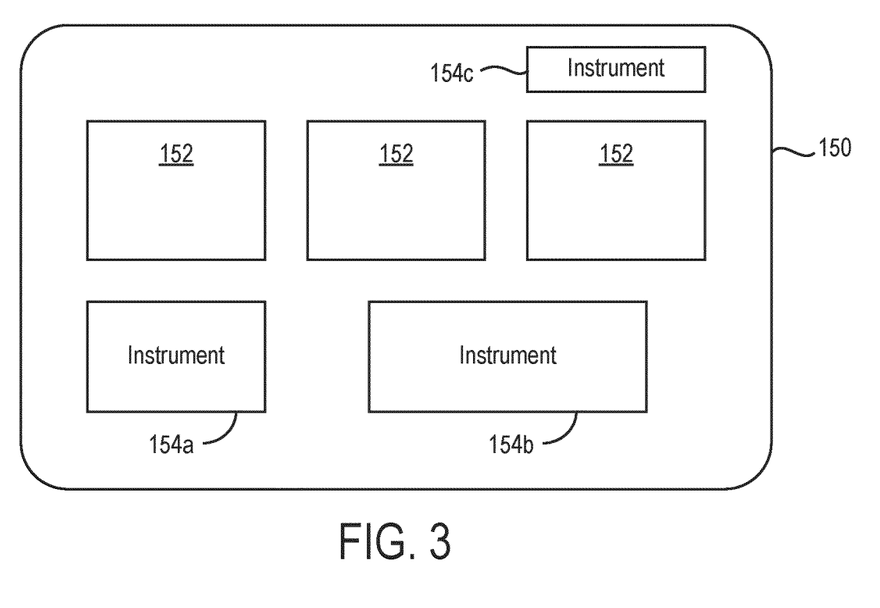
FIG. 3 illustrates an example of an external region according to inventive concepts disclosed herein.

FIG. 3 illustrates an example of an external region 150 according to the inventive concepts disclosed herein. The external region 150 may be a view within a cockpit of an aircraft, or within a drivers region of a vehicle, for example. The external region 150 may include a number of portions. For example, in the case that the external region 150 is a view within a cockpit of an aircraft, the portions may include window portions 152, which provide a view of outside the cockpit, and cockpit instrument sections 154A, 154B and 154C corresponding to flight instruments. The cockpit instrument sections may include displays.

Figure 4:
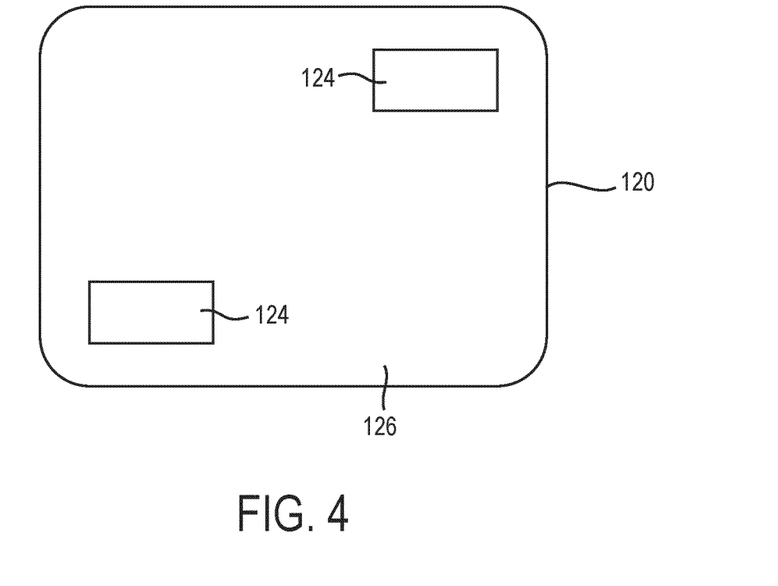
FIG. 4 illustrates an example of the internal display illustrating an overlay region and a non-overlay region according to inventive concepts disclosed herein.

FIG. 4 illustrates an example of the internal display 120 illustrating overlay regions 124, and a non-overlay region 126. The overlay region 124 corresponds to regions of the external region 150 which are blocked from view via the variable transparency areas 122. The non-overlay region 126 correspond to regions of the external region 150 which are not blocked from view via the variable transparency areas 122, where those unblocked regions of the external region 150 are displayed on the internal display 120. The controller 130 controls the internal display 120 to display overlay information at the overlay regions 124.

Figure 5:
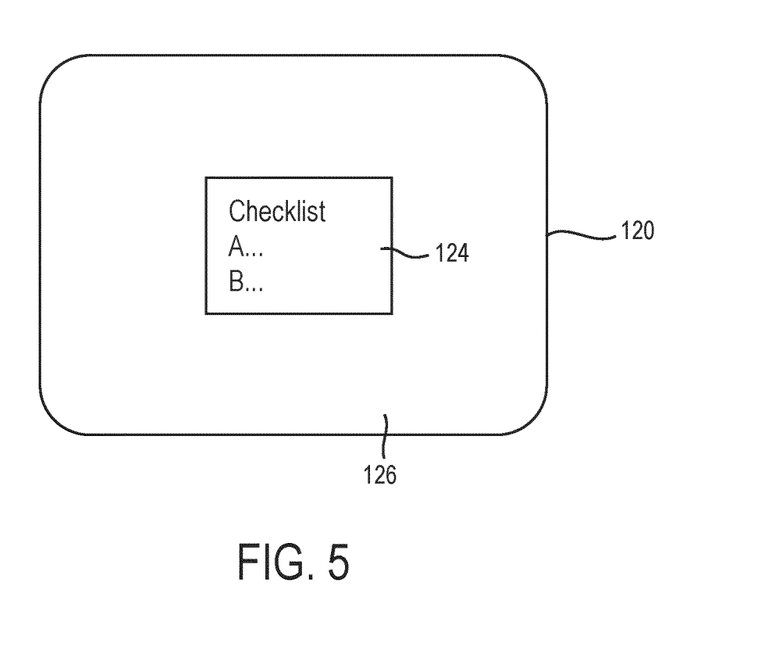
FIG. 5 illustrates an example of the internal display where the overlay region corresponds to a checklist according to inventive concepts disclosed herein.

FIG. 5 illustrates an example of the internal display 120 according to inventive concepts disclosed herein, where the overlay region 124 corresponds to a checklist. In this case the overlay information is information regarding the checklist, such as the items listed in the checklist. The overlay region 124 of the internal display 120 may be arranged to occlude a non-critical cockpit instrument section of the external region 150, so as to not block important information. The non-critical cockpit instrument section which is blocked may be a flight plan, for example, when the overlay region 124 corresponds to a checklist with a start-up sequence, for example.

The controller 130 may confirm that a user is looking at the checklist information using the eye tracker 170 and possibly the head tracker 175. The eye tracker 170 tracks the user eye 140 orientation and position, and sends the user eye orientation and position data to the controller 130. The controller 130 determines whether or not the user eye 140 is looking at the checklist information using the user eye orientation and position data, and using the position of the overlay region 124 corresponding to the checklist.

Figure 6:
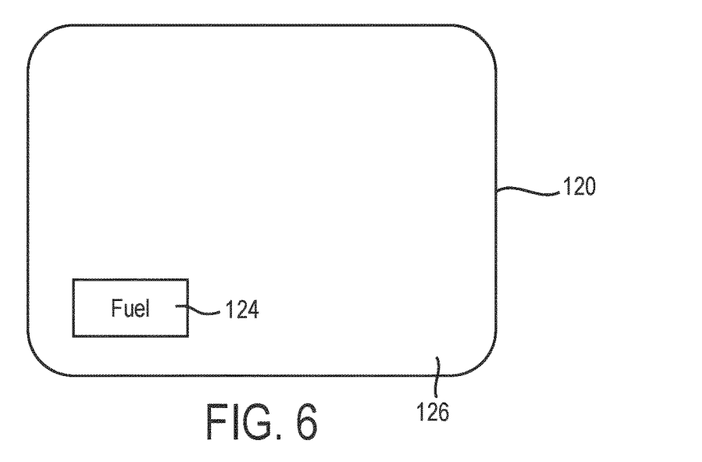
FIG. 6 illustrates an example of the internal display where the overlay region corresponds to a display region of an external region where a display region has failed according to inventive concepts disclosed herein.

FIG. 6 illustrates an example of the internal display 120 according to inventive concepts disclosed herein, where the overlay region 124 corresponds to a display region of the external region 150 where the display region has failed. In this case the overlay information is virtual information regarding a replacement display region corresponding to the failed display region. The overlay region 124 of the internal display 120 may be arranged to occlude the failed display region of the external region 150.

In the case of a failed display region of the external region 150, a warning signal may be sent to the controller 130. The warning signal is received by the controller 130, and indicates that a display region of the external region has failed. The controller 130 controls the internal display 120 to overlay the replacement display region over the regions of the internal display 120 corresponding to the display region of the external region which has failed.

Figure 7:
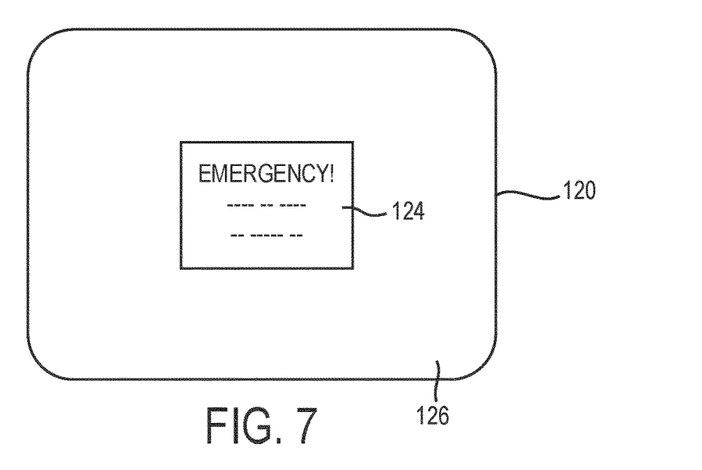
FIG. 7 illustrates an example of the internal display where the overlay region corresponds to emergency information according to the inventive concepts disclosed herein.

FIG. 7 illustrates an example of the internal display 120 according to inventive concepts disclosed herein, where the overlay region 124 corresponds to emergency information. In this case the overlay information is information regarding an emergency. The overlay region 124 of the internal display 120 may be arranged to occlude a non-critical cockpit instrument section of the external region 150, so as to not block important information.

The controller 130 may receive an emergency signal indicating that an emergency has occurred. The controller 130 controls the internal display 120 to overlay emergency information indicating an emergency during the time that the emergency continues.

The controller 130 may confirm that the user is looking at the emergency information using the eye tracker 170, and possibly the head tracker 175. The eye tracker 170 tracks the user eye 140 orientation and position, and sends the user eye orientation and position data to the controller 130. The controller 130 determines whether or not the user eye 140 is looking at the emergency information using the user eye orientation and position data, and using the position of the overlay region 124 corresponding to the emergency information. The controller 130 may electrochromically occlude or partially occlude all non-critical, non-emergency portions of the field of view and emphasize the critical portions.

Figure 8:
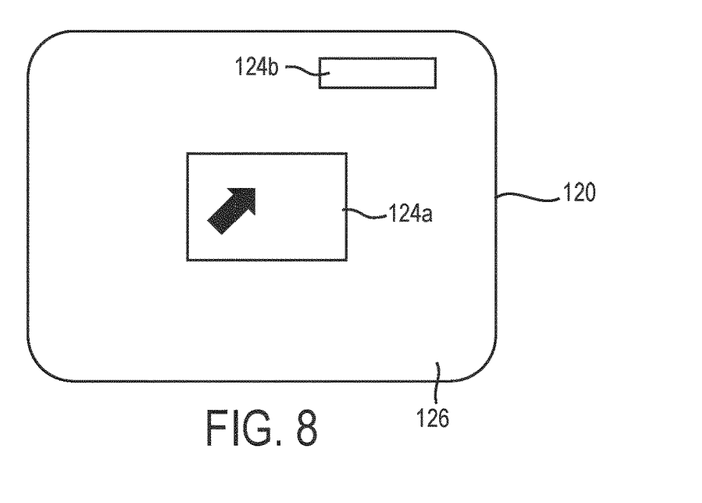
FIG. 8 illustrates an example of the internal display where the overlay region corresponds to direction information for a first overlay region and to peripheral information for a second overlay region according to inventive concepts disclosed herein.

FIG. 8 illustrates an example of the internal display 120 according to inventive concepts disclosed herein, where the overlay region 124 corresponds to direction information for a first overlay region 124a and to peripheral information for a second overlay region 124b. The first overlay region 124a for the direction information may be disposed in an inner region of the internal display 120, for example. The second overlay region 124b for the peripheral information is disposed in a peripheral region of the internal display 120. The direction information is information directing a user's attention to the second overlay region 124b. For example, if the second overlay region 124b is in the upper right hand corner of the internal display 120, the direction information may be an arrow pointing to the second overlay region 124b. As another example, if the second overlay region 124b is in the upper right hand corner of the internal display 120, the direction information may be text saying "LOOK IN UPPER RIGHT."

The controller 130 may confirm that a user is looking at the peripheral information using the eye tracker 170, and possibly the head tracker 175. The eye tracker 170 tracks the user eye 140 orientation and position, and sends the user eye orientation and position data to the controller 130. The controller 130 determines whether or not the user eye 140 is looking at the peripheral information using the user eye orientation and position data, and using the position of the second overlay region 124b corresponding to the peripheral information.

Figure 9:
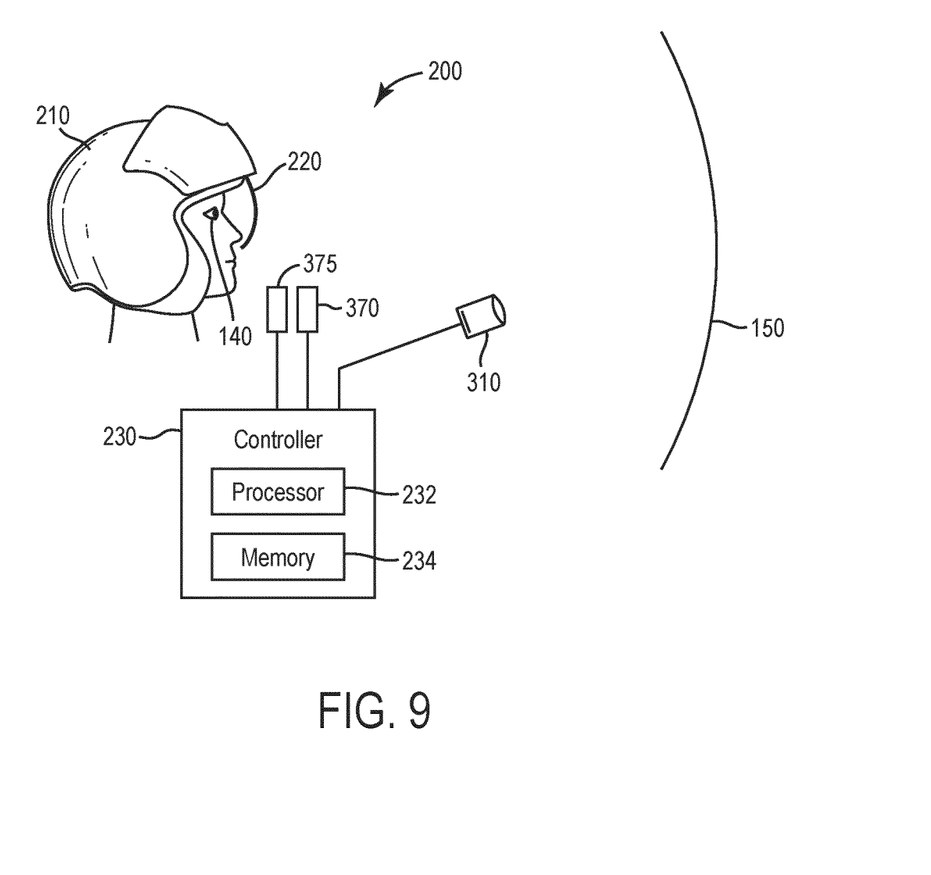
FIG. 9 is a schematic illustrating a head worn display having image detectors according to inventive concepts disclosed herein.

According to inventive concepts disclosed herein, FIG. 9 is a schematic illustrating a HWD 200 according to inventive concepts disclosed herein. The HWD 200 includes a head attachment region 210, an internal display 220, a controller 230 and one or more image detectors 310. The HWD may further include an eye tracker 370 and a head tracker 375.

The head attachment region 210 may be worn by a user, and may be a helmet, for example. Alternatively, the head attachment region 210 may include googles, for example. The internal display 220 is attached to the head attachment region 210.

The HWD 200, including the head attachment region 210, internal display 220, controller 130, and one or more image detectors 310, is shown in FIG. 1 relative to a user eye 140, and an external region 150. The user eye 140 and the external region 150 are not part of the HWD 200. The eye tracker 370 tracks the position and orientation of the user eye 140. The head tracker 375 tracks the position and orientation of the user head.

The one or more image detectors 310 are arranged to detect an image of the external region 150 external to the internal display 220. The one or more image detectors 310 may be cameras, for example. In the case that the one or more image detectors 310 are a plurality of image detectors, the images from the one or more image detectors 310 may be combined to form a combined image.

The controller 230 may include a processor 232 and a memory 234. The controller 230 controls the eye tracker 370 to determine the orientation and position of the user eye 140. In this regard the eye tracker 370 may include a head tracker tracking the head orientation and position of the user. The controller 230 further controls the internal display 220 to display the detected image from the one or image detectors 310, and further to display overlay information over the displayed detected image. The overlay information may include text and/or symbols, for example. The internal display 220 may be a virtual reality display, or may be an augmented reality display, for example.

The overlay information may include warning information, emergency information, checklist information, or replacement display information, in a similar fashion to the HWD 100 of FIG. 1. The overlay information may include critical information. The eye tracker 370 may be arranged to track a position and orientation of the eye 140 of a user wearing the HWD. The head tracker 375 may be arranged to track a position and orientation of the head of a user wearing the HWD. The controller 230 may confirm that the user is viewing the critical information based on the tracked eye position and orientation of the user.

The controller 220 may be configured to provide foveated rendering. In this regard, the controller 220 may be configured to increase a resolution of a region of the internal display 220 viewed by an eye 140 of a user and to decrease a resolution of another region of the internal display not viewed by the user based on the tracked eye position of the user. In this case, the processing time of the controller may be reduced since the regions of the internal display not viewed are lower resolution and thus the rendering time for the lower resolution regions is reduced.

Figure 10A:
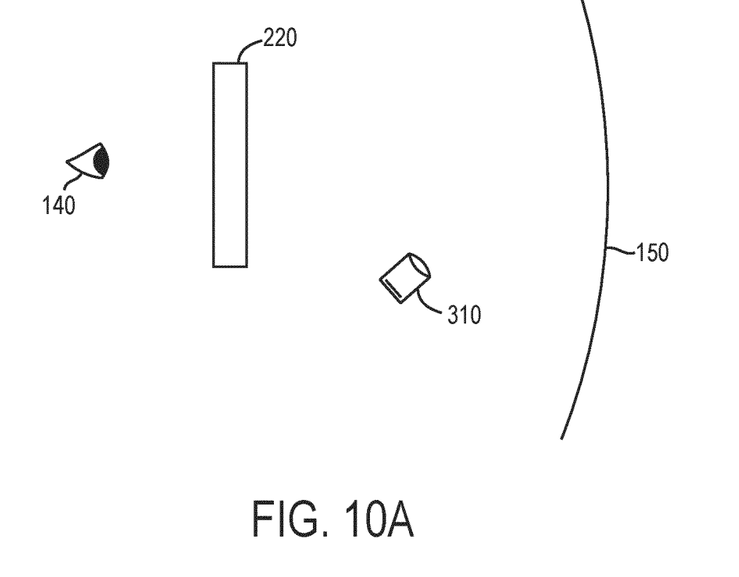
FIG. 10A illustrates a side view of an arrangement of the internal display of FIG. 9 according to inventive concepts disclosed herein.
Figure 10B:
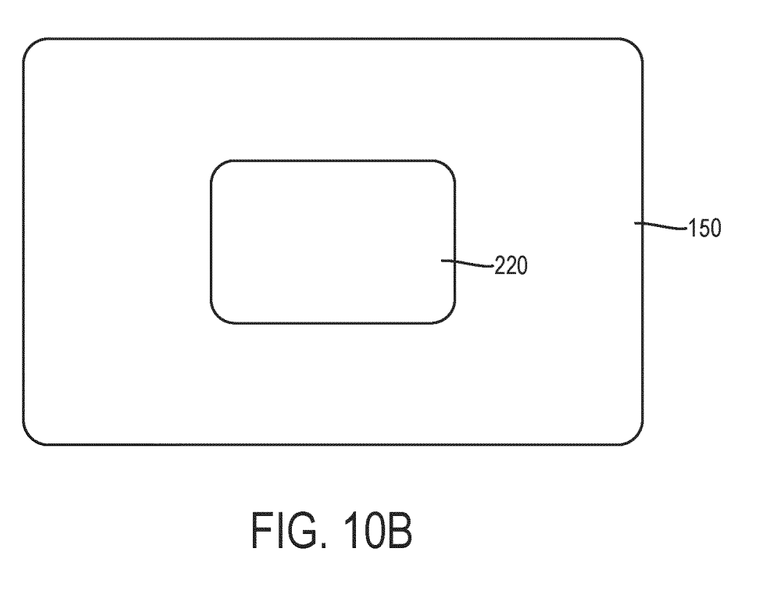
FIG. 10B illustrates a front view of an arrangement of the internal display of FIG. 9 according to inventive concepts disclosed herein.

FIG. 10A illustrates an arrangement of the internal display 220 from a side view relative to the user eye 140, at least one image detector 310, and the external region 150, while FIG. 10B illustrates an arrangement of the internal display 220 from a front view relative to the external region 150.

Figure 11:
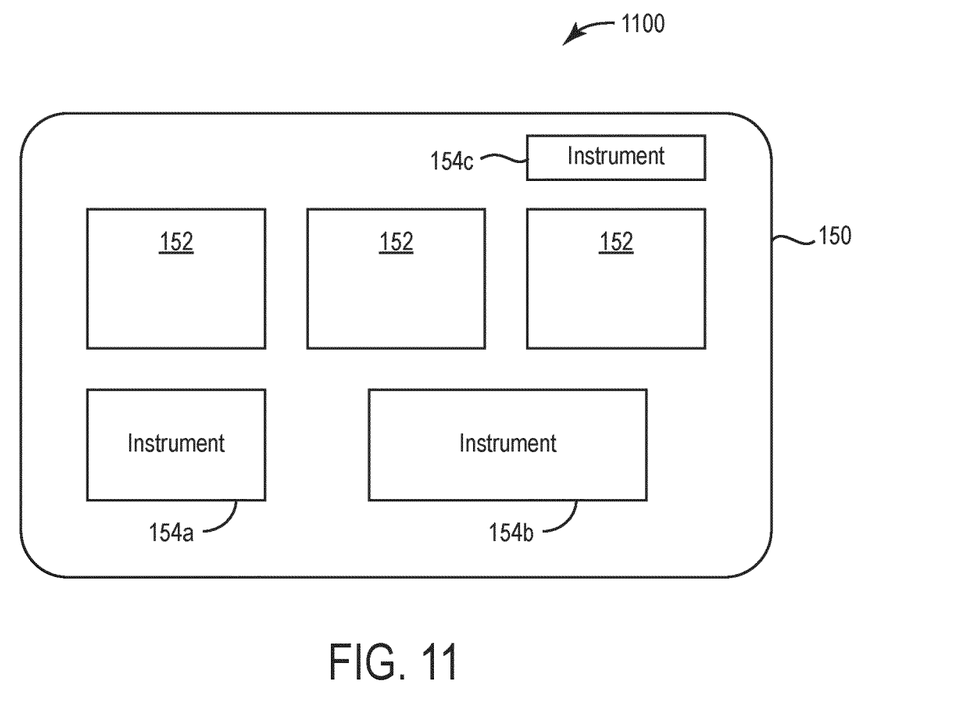
FIG. 11 illustrates an example of an image detected by at least one image detector of an external region according to inventive concepts disclosed herein.

FIG. 11 illustrates an example of an image 1100 detected by the at least one image detector 310 of an external region 150 according to the inventive concepts disclosed herein. The image 1100 of the external region 150 may be a view within a cockpit of an aircraft, or within a drivers region of a vehicle, for example. The image of the external region 150 may include a number of portions. For example, in the case that the image 1100 of external region 150 is a view within a cockpit of an aircraft, the portions may include window portions 152, which provide a view of outside the cockpit, and cockpit instrument sections 154A, 154B and 154C corresponding to flight instruments. The cockpit instrument sections may include displays. The external region 150 may include a region external to the cockpit, which would enclose the HWD 200.

In the case that the internal display 220 is a virtual reality display, the display 220 may display only rendered images. In this case the internal display 220 displays the image from the at least one image detector 310, and further the controller 230 controls the internal display 220 to display overlay information over the image from the at least one image detector 310.

In some applications, such as within a cockpit of an aircraft where the internal display 220 is a virtual reality display and only rendered information is displayed on the internal display 220, the at least one image detector 310 may be arranged to only image an external region separate from the cockpit instrument sections. In particular, the at least one image detector 310 may be arranged to image regions where the users hands may be, and regions beyond the cockpit, such as regions seen through the window portions 152, to allow for navigation of the aircraft by a pilot. In this case, the image information of the instrument sections 154A, 154B and 154C within the cockpit are provided by the controller 230, and are not based on images from the at least one image detector 310.

In the case that the internal display 220 is an augmented reality display, the internal display 220 displays an image from the external region 150 as seen by the user eye 140, the image from the at least one image detector 310, and the display overlay information from the controller 230. In this case the display 220 may be transparent to allow an image from the external region 150 to be seen by a user eye 140.

In some application, such as within a cockpit of an aircraft where the internal display 220 is an augmented reality display and the internal display 220 displays an image from the external region 150 as seen by the user eye 140 through a transparent display, the at least one image detector 310 may be arranged to image an external region within the cockpit as well beyond the cockpit, such as another external region which may overlap the external region.

Embodiments of the inventive concepts disclosed herein regarding HWDs with variable transparency areas provide for functions such as enhancement, replacement, augmentation and occlusion in displays. The HWDs provide functionality for providing check lists at appropriate times, replacing the view of failed displays, providing visual information for emergency situations, and providing peripheral cue augmentation.

HWDs may also be arranged in a mixed reality configuration where an internal display viewed by a user includes images of a region external to the internal display which is detected by image detectors. In the mixed reality configuration the internal display displays the detected image along with overlay information. Such an arrangement may obtain a wide FOV, such as nearly 120 degrees, for example. Further, real world imagery is relayed to the user via the image detectors.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. A head worn display (HWD) comprising:
    a head attachment region;
    an internal display viewable by a user comprising a variable transparency layer configured to provide a plurality of predetermined variable transparency areas, and a combiner configured to display an image, wherein the image and at least a portion of an external region external to the HWD is viewable through the combiner; and
    a controller configured to control the plurality of predetermined variable transparency areas of the variable transparency layer to block a view of a region of the external region and to control the combiner to overlay information in a region of the internal display in the region of the external region, wherein the variable transparency layer is positioned behind the combiner, wherein the information is an emergency indication and the region is conformal with a location of a non-critical instrument section of an aircraft associated with the external region,
    wherein the controller is configured to:
    receive a warning signal indicating that a cockpit instrument display of the portion of the external region has failed, and
    control the internal display to overlay a replacement cockpit instrument display corresponding to the cockpit instrument display of the portion of the external region which has been determined to have failed.

2. The HWD of claim 1, further comprising
    an eye tracker configured to track a position and orientation of an eye of a user wearing the HWD, wherein the controller is configured to confirm that the user is viewing the emergency indication based on the tracked eye position of the user.

3. The HWD of claim 1, wherein the external region includes a cockpit display.

4. The HWD of claim 3, wherein the external region includes flight instruments.

5. The HWD of claim 4, wherein the overlay information is disposed in a center of the combiner.

6. The HWD of claim 1, wherein the controller is configured to:
    receive an emergency signal indicating that an emergency has occurred, and control the internal display to overlay the emergency indication during the time the emergency occurs.

7. The HWD of claim 1,
    wherein the controller is configured to control the combiner of the internal display to display overlay information on a peripheral region of the internal display, and to control the combiner of the internal display to display directing information on an inner region of the internal display, the directing information directing a user to view the overlay information on the peripheral region of the internal display.

8. A head worn display (HWD) comprising: a head attachment region;
    an internal display viewable by a user of the HWD, the internal display comprising a combiner and a variable transparency layer positioned behind the combiner;
    one or more image detectors arranged to detect an image of an external region external to the internal display; and
    a controller configured to control the combiner to display the detected image and to overlay information over the displayed detected image and to control the variable transparency layer to block view of a region of the external region, wherein the information is an emergency indication and the region is conformal with a location of a non-critical instrument section of an aircraft associated with the external region,
    wherein the controller is configured to:
    receive a warning signal indicating that a cockpit instrument display of the external region has failed, and
    control the internal display to overlay a replacement cockpit instrument display corresponding to the cockpit instrument display of the external region which has been determined to have failed.

9. The HWD of claim 8, wherein the internal display is an augmented reality display having a transparent region arranged to provide a view of another external region.

10. The HWD of claim 9, wherein the another external region includes a display region of a cockpit enclosing the HWD, and overlaps the external region.

11. The HWD of claim 10, wherein the external region includes a region external to the cockpit.

12. The HWD of claim 8, wherein the internal display is a virtual reality display.

13. The HWD of claim 12, wherein the external region includes a region external to a cockpit enclosing the HWD.

14. The HWD of claim 8, wherein the overlay information includes critical information, the HWD further comprising an eye tracker arranged to track a position and orientation of an eye of a user wearing the HWD, wherein the controller is configured to confirm that the user is viewing the critical information based on the tracked eye position of the user.

15. The HWD of claim 8, wherein the overlay information includes any pertinent or critical information.

16. The HWD of claim 8, further comprising an eye tracker arranged to track an eye position of a user wearing the HWD, wherein the controller is configured to increase a resolution of a region of the internal display viewed by the user and to decrease a resolution of another region of the internal display not viewed by the user based on the tracked eye position of the user.

17. The HWD of claim 8, wherein the one or more image detectors include cameras.

\* \* \* \* \*